(12) United States Patent
Dholakia et al.

(10) Patent No.: US 11,861,543 B2
(45) Date of Patent: *Jan. 2, 2024

(54) OPTIMIZED PACKAGE LOADING

(71) Applicant: Amazon Technologies, Inc., Seattle, WA (US)

(72) Inventors: Stavan Dholakia, Seattle, WA (US); Nicholas Hernandez, Somerville, MA (US); Minh Le, Methuen, MA (US); Jacob Lauer, Westford, MA (US); Shivani Sheopory, Somerville, MA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 153 days.

This patent is subject to a terminal disclaimer.

(21) Appl. No.: 17/111,609

(22) Filed: Dec. 4, 2020

(65) Prior Publication Data
US 2021/0090005 A1 Mar. 25, 2021

Related U.S. Application Data

(63) Continuation of application No. 16/132,701, filed on Sep. 17, 2018, now Pat. No. 10,867,275.

(51) Int. Cl.
G06Q 10/083 (2023.01)
B25J 9/00 (2006.01)
(Continued)

(52) U.S. Cl.
CPC .......... *G06Q 10/083* (2013.01); *B25J 9/0093* (2013.01); *B25J 9/1697* (2013.01);
(Continued)

(58) Field of Classification Search
CPC ................. B25J 9/0093; B25J 9/1697; B65G 2203/0208; B65G 2203/0225;
(Continued)

(56) References Cited

U.S. PATENT DOCUMENTS 6,876,958 B1 4/2005 Chowdhury et al.
7,653,457 B2 * 1/2010 Bloom ..................... G07C 9/23
700/226
(Continued)

*Primary Examiner* — Katrina R Fujita
(74) *Attorney, Agent, or Firm* — Thomas|Horstemeyer, LLP

(57) ABSTRACT

Disclosed are various embodiments for optimizing cubic utilization when loading items into a loading space. A current loading configuration of the loading space can be determined according to image data obtained by 3D sensors. Item data (e.g., volume, mass, type, dimensions, etc.) can be determined for incoming items to be loaded into the loading space. The current loading configuration and the item data can be used to determine an item sequence and optimal placement location for the next item to be loaded such that a cubic efficiency of the loading space is maximized and amount of air gaps between items is minimized. The current loading configuration can further be used to determine if a sensing system or an item loading system needs to be repositioned. Whether the next item was placed in the optimal placement can also be verified based on subsequent image data obtained by the 3D sensors.

20 Claims, 8 Drawing Sheets

(51) Int. Cl.
*G06T 7/62* (2017.01)
*B25J 9/16* (2006.01)
*G06V 20/64* (2022.01)
*G06V 10/147* (2022.01)
*G06V 20/52* (2022.01)
*G06V 20/59* (2022.01)

(52) U.S. Cl.
CPC .............. *G06T 7/62* (2017.01); *G06V 10/147* (2022.01); *G06V 20/52* (2022.01); *G06V 20/59* (2022.01); *G06V 20/64* (2022.01)

(58) Field of Classification Search
CPC ...... B65G 2203/0233; B65G 2203/041; B65G 67/20; G06Q 10/083; G06T 7/521; G06T 7/62; G06V 10/147; G06V 20/52; G06V 20/59; G06V 20/64; G06V 2201/12
See application file for complete search history.

(56) References Cited

U.S. PATENT DOCUMENTS

| | | | |
|---|---|---|---|
| 8,615,386 B2 | 12/2013 | Baldes et al. | |
| 8,849,634 B2 | 9/2014 | Fritz | |
| 9,315,344 B1 | 4/2016 | Lehmann | |
| 9,714,145 B1 | 7/2017 | Lehmann | |
| 9,926,131 B1* | 3/2018 | Lehmann | G06Q 10/083 |
| 9,969,571 B1 | 5/2018 | Lehmann | |
| 2002/0021954 A1 | 2/2002 | Winkler | |
| 2011/0122257 A1 | 5/2011 | Kirk | |
| 2014/0104414 A1* | 4/2014 | McCloskey | G01B 11/02 348/135 |
| 2014/0163737 A1* | 6/2014 | Nagata | B25J 9/1697 700/259 |
| 2014/0365258 A1* | 12/2014 | Vestal | G05D 1/0297 901/1 |
| 2017/0043953 A1 | 2/2017 | Battles et al. | |
| 2017/0243158 A1 | 2/2017 | Gupta | |
| 2017/0190510 A1 | 7/2017 | Porat | |
| 2018/0174087 A1 | 6/2018 | Wilkinson et al. | |
| 2018/0194575 A1* | 7/2018 | Anderson | B65G 67/02 |
| 2018/0218185 A1* | 8/2018 | High | G06Q 10/087 |
| 2019/0197701 A1 | 6/2019 | Krishnamurthy et al. | |
| 2019/0197716 A1* | 6/2019 | Trajkovic | G06F 3/048 |
| 2019/0199999 A1 | 6/2019 | Krishnamurthy et al. | |
| 2019/0355144 A1 | 11/2019 | Korobov et al. | |
| 2020/0193336 A1 | 6/2020 | Capoia et al. | |

\* cited by examiner

OPTIMIZED PACKAGE LOADING

CROSS-REFERENCE TO RELATED APPLICATIONS

This application is a continuation of, and claims priority to, co-pending U.S. patent application entitled "OPTIMIZED PACKAGE LOADING," filed on Sep. 17, 2018, and assigned application Ser. No. 16/132,701, which is incorporated by reference in its entirety.

BACKGROUND

At a facility, various items, articles, products, or packages may be organized for shipment to other locations. Once packages containing, for example, pre-packaged customer orders are prepared for delivery, the packages are loaded onto a delivery vehicle.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to a package loading system that optimizes cubic utilization during the loading of packages into a defined loading space (e.g., vehicle trailer, vehicle interior, compartment, container, pallet, etc.). Specifically, the package loading system of the present disclosure is configured to guide an agent (e.g., person, automated system, etc.) in constructing package walls within the defined space by (1) determining an optimal placement for incoming packages that minimizes air gaps and empty spaces within the defined space and (2) notifying the agent of the optimal placement. The optimal placement for the incoming packages is determined according to a current loading configuration in the defined space and package data (e.g., volume, mass, type, etc.) associated with incoming packages.

Typically, as vehicles arrive at facilities, agents manually load packages into the vehicle (e.g., vehicle trailer, compartment, interior, container coupled to vehicle, etc.) and/or other type of loading space. Packages can be loaded into a vehicle by building walls of packages. According to various embodiments of the present disclosure, cubic efficiency of a loading space can be improved by determining an optimal placement for incoming packages, thereby reducing loading time and costs associated with the loading of packages onto vehicles for delivery.

According to various embodiments, three-dimensional (3D) sensors (e.g., RealSense™ cameras) can obtain point cloud data that can be used to determine a current loading configuration (e.g., current placement of packages already loaded in the current wall being built) of the defined space. Package data (e.g., mass, volume, type of package, etc.) can be determined using sensor data obtained via a sensor on a conveyor system that transports packages to be loaded onto the vehicle. For example, the sensor on the conveyor system can scan a package identifier associated with a package. The package identifier can then be used to obtain package data associated with the particular package. For example, the package identifier can be used to identify package data stored in a data store associated with the facility. According to various embodiments, the current loading configuration and the package data can be used as inputs to an optimization engine that is configured to determine the optimal placement and orientation for incoming packages such that the amount of empty space within the delivery vehicle is minimized and the cubic efficiency is improved.

Figure 1:
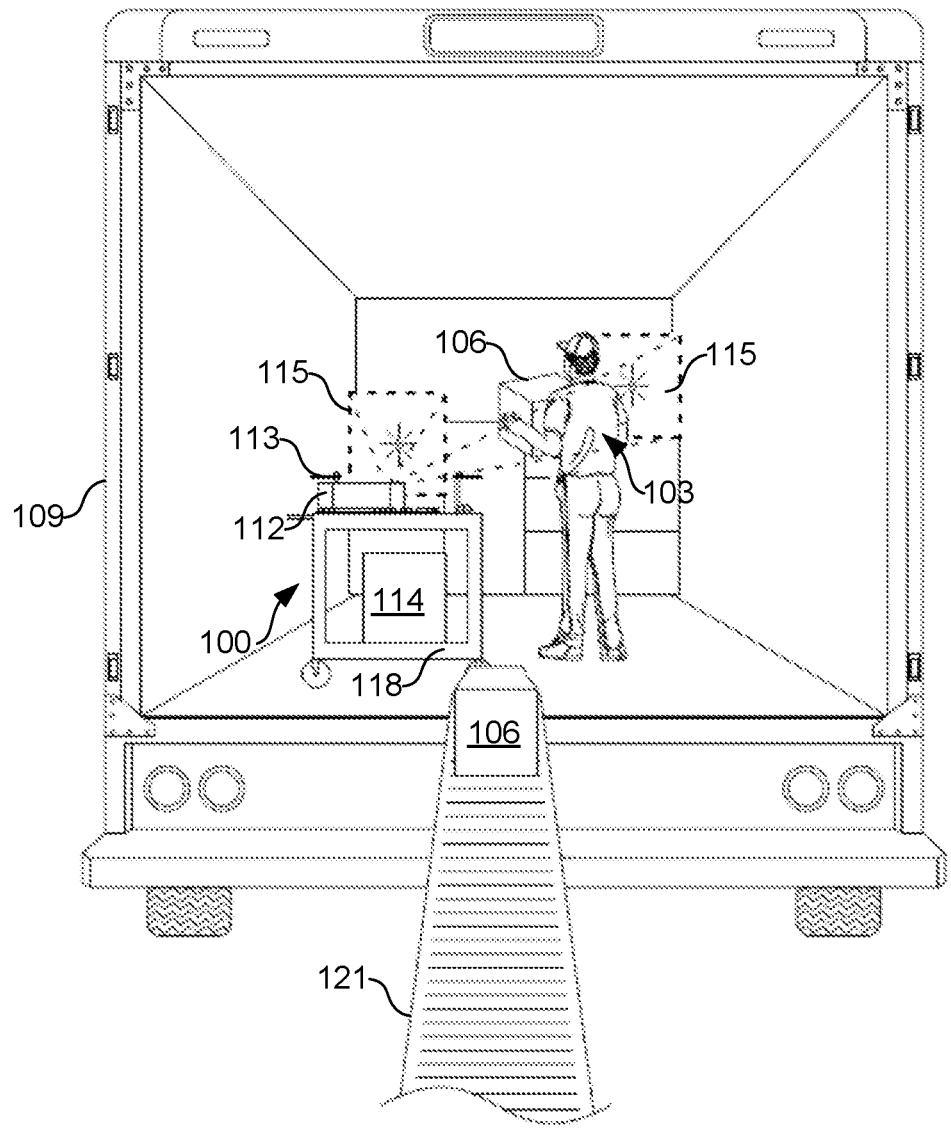
FIG. 1 is a drawing of an example scenario illustrating packages being loaded into a vehicle based on an optimal placement according to various embodiments of the present disclosure.

With reference to FIG. 1, shown is an example scenario of a package loading system 100 of the present disclosure being used to notify an agent 103 of the optimal placement of a package 106 into a vehicle 109. As shown in FIG. 1, the package loading system 100 is projecting, via an identifying device 112 (e.g., a projector), a light onto empty spaces 115 within the vehicle 109. This light can assist the agent 103 by highlighting the optimal placement location for an incoming package 106 as determined by the package loading system 100.

According to various embodiments, the packages 106 may comprise boxes, pails, containers, special packaging envelopes, and/or any other type of packaging. The package loading system 100 can comprise an identifying device 112, one or more 3D sensors 113, at least one computing device 114, a display 209 (FIG. 2), and/or any other component as can be appreciated. In some embodiments, the package loading system 100 further comprises a mobile unit 118 that allows the package loading system 100 to be repositioned during the loading process. For example, the mobile unit 118 can comprise a cart, autonomous vehicle, robotic unit, and/or any other type of device that can move in any direction for repositioning and/or reorientation. The components of the package loading system 100 (e.g., identifying device 112, 3D sensor(s) 113, computing device 114, display 209, etc.) can be disposed on the mobile unit 118.

According to various embodiments, the 3D sensors 113 can obtain data that represents a current layout configuration 403 (FIG. 4) of the packages 106 already positioned and/or oriented within the vehicle 109. While the layout configuration 403 of FIG. 1 illustrates the vehicle interior having a rectangular cross-section, it should be noted that the vehicle interior is not limited to a rectangular cross-section and can comprises any shape as can be appreciated. In addition, it should be noted that the vehicle interior can comprise various protrusions (e.g., wheel wells), compartments, etc.), and/or other features represented by the cross-section of the vehicle that corresponds to the layout configuration 403.

As shown in FIG. 1, incoming packages 106 to be loaded into the vehicle 109 can be transported to the vehicle 109 via a conveyor system 121. According to various embodiments, package data 212 (FIG. 2) (e.g., mass, volume, package type, etc.) associated with the incoming packages can be obtained and used to identify the incoming packages. In some embodiments, the conveyor system 121 can comprise conveyor sensors 215 (FIG. 2) that can be configured to scan packages 106 being transported on the conveyor system 121. For example, the conveyor sensor 215 can scan a package identifier 218 (FIG. 2) affixed on a package 106. The package identifier 218 can then be used to obtain package data 212 associated with the particular package 106 that can be stored in a data store.

According to various embodiments, the package loading system 100 can use the current loading configuration 403 obtained from the 3D sensors 113 and the package data 212 associated with the incoming packages 106 on the conveyor system 121 to determine an optimal placement of the incoming packages 106. The optimal placement can be determined according to a package sequencing assigned to the incoming packages 106 and the identified empty space(s) 115 associated with the loading configuration 403.

For example, the package loading system 100 can determine a package sequence for loading based on the incoming packages 106. As such, the next arriving package 106 being transported via the conveyor system 121 may not correspond to the first package 106 in the package sequence. In such instances, the agent 103 can place the next arriving package 106 in a secondary location (e.g., off to the side, in a container, etc.) until notified to load the particular package 106. Once an optimal placement is determined for one or more incoming package 106, the package loading system 100 can assist the agent 103 in placing the first package 106 in the package sequence in the optimal location.

For example, as shown in FIG. 1, the package loading system 100 can cause the identifying device 112 to direct a light at the empty space 115 where the next package 106 is to be placed. In some embodiments, the package loading system 100 can generate a user interface 221 (FIG. 2) to be rendered via a display 209 that includes an identification of a package 106 (e.g., identification of specific package, type of package, etc.) and a location of where the package 106 is to be placed. In some embodiments, the package loading system 100 can emit an audio signal which can include the identification of the package 106 and/or location of placement in order to assist the agent 103 in placement of the package 106.

The package loading system 100 can repeat the above discussed process of capturing images of the loading configuration and determining an optimal placement of incoming packages 106 until there are no more incoming boxes and/or the current wall being constructed is complete. If there are additional incoming packages 106 to be loaded following the completion of a package wall, the package loading system 100 can be repositioned to begin the building process of an additional wall.

It should be noted that although the agent 103 of FIG. 1 is shown to be a person, in some embodiments, the agent 103 can comprise an automated system, such as, for example, a gantry system configured to pick up a package arriving on a conveyor system 121, orient the package 106 in an orientation (e.g., XYZ, YXZ, ZYX, etc.) determined by the package loading system 100, and place the package 106 in the appropriate orientation within the optimal package placement location. It should also be noted that the package 106 can comprise an item, a product, a package, a box, a tote containing one or more items, a bucket, and/or other type of item and/or container. It should also be noted that although the defined space for the packages 106 to be loaded is referred to as a vehicle 109 and/or vehicle interior, the defined area can comprise a vehicle trailer, vehicle interior, compartment, container, pallet, and/or any other type of space for loading packages 106 as can be appreciated.

In the following discussion, a general description of the system and its components is provided, followed by a discussion of the operation of the same.

Figure 2:
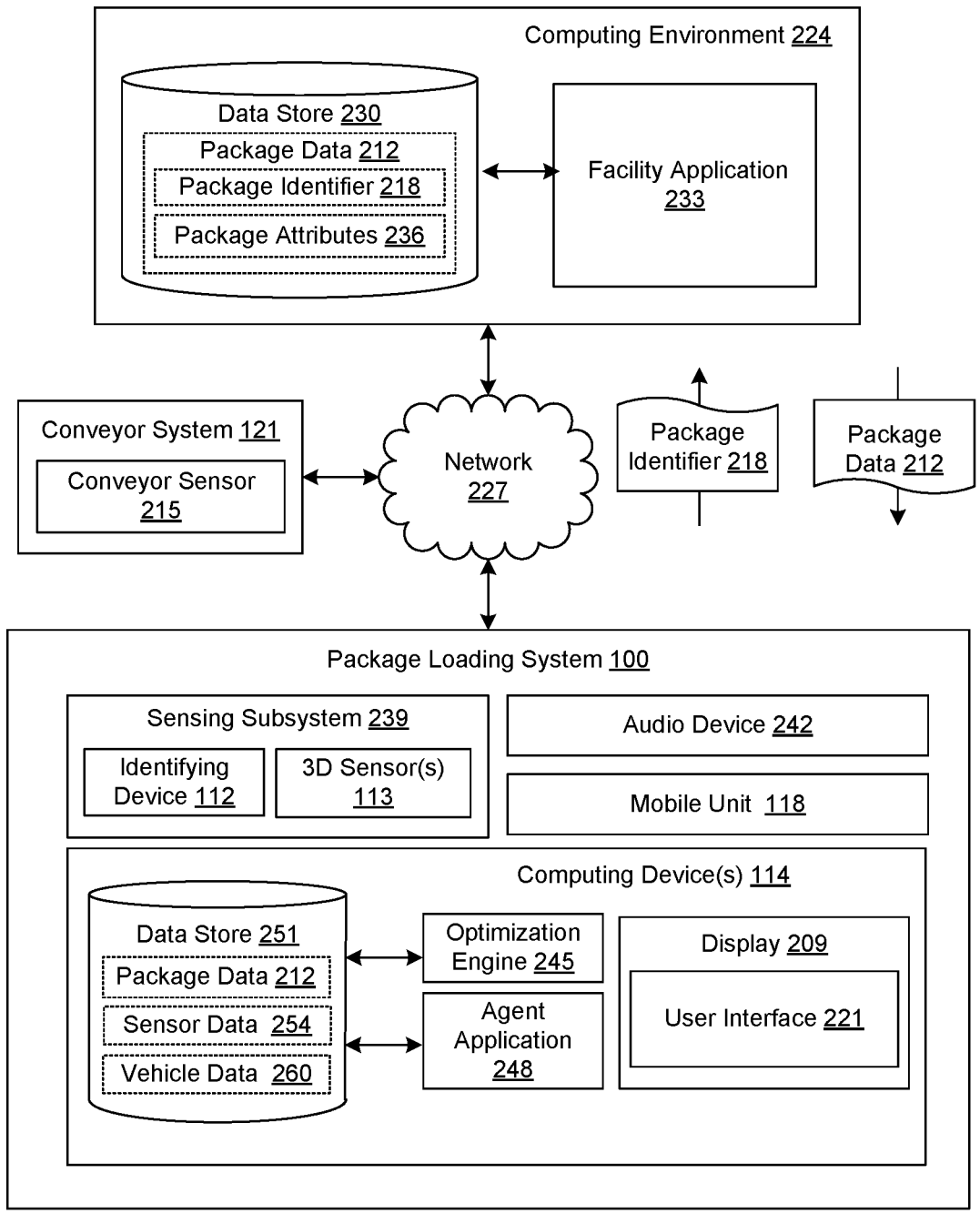
FIG. 2 is a schematic block diagram of a networked environment according to various embodiments of the present disclosure.

With reference to FIG. 2, shown is a networked environment 200 according to various embodiments. The networked environment 200 includes a computing environment 224, the package loading system 100, and a conveyor system 121, which are in data communication with each other via a network 227. The network 227 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 224 includes one or more computing devices including at least one processor circuit, for example, having a processor and a memory. Various applications and/or other functionality may be executed in the computing environment 224 according to various embodiments. Also, various data is stored in one or more data stores 230 that are accessible to the computing environment 224.

The components executed on the computing environment 224, for example, include a facility application 233, and other applications, services, processes, systems, engines, or functionality not discussed in detail herein. The facility application 233 is executed to facilitate management of facility information. For example, the facility application 233 can obtain package data 212 associated with packages 106 (FIG. 1) being created, sorted, transported, etc., within the facility. The facility application 233 can be used to receive requests for package data 212 associated with the packages 106 within the facility. The facility application 233 can further be used to provide package data 212 to requesting devices, such as, for example, the conveyor system 121, the package loading system 100, and/or other systems as can be appreciated.

The data stored in the data store 230 includes, for example, package data 212, and potentially other data. The package data 212 comprises information about packages 106 associated with the facility. For example, the packages data 212 can correspond to packages being packaged and/or sorted within the facility. The package data 212 can comprise a package identifier 218, package attributes 236, and/or any other type of information. The package identifier 218 can comprise an identifier that is unique to the package 106. For example, the package identifier 218 can comprise an alphanumeric code, a barcode, quick response (QR) code, radio frequency identifier (RFID) and/or other type of identifier. The package attributes 236 can correspond to a package mass, a package volume, package dimensions, a package type, and/or any other type of package attribute as can be appreciated.

The conveyor system 121 may include a belt conveyor, a line shaft roller conveyor with a plurality of rollers, a chain conveyor, and any other conveyor system that can advance packages 106 from one location to another. In some embodiments, a portion of the conveyor system 121 is positioned inside of a vehicle 109 (FIG. 1). In other embodiments, the entire conveyor system 121 is positioned outside of the vehicle 109.

The conveyor system 121 comprises one or more conveyor sensors 215 configured to obtain data associated with packages being transported on the conveyor system 121. For example, according to various embodiments, the conveyor sensor 215 can scan a package identifier 218 affixed on a package 106 being transported on the conveyor system 121. The package identifier 218 can be used to identify and obtain package data 212 associated with the particular package 106.

The package loading system 100 can determine an optimal package placement of incoming packages 106 to be loaded into a vehicle 109 and instruct an agent 103 (FIG. 1) in placing a particular package 106 in the optimal location in order to maximize cubic efficiency within the vehicle 109. The package loading system 100 comprises a sensing subsystem 239, at least one computing device 114, a display 209, a mobile unit 118, an audio device 242 and/or any other component as can be appreciated. The sensing subsystem 239 comprises an identifying device 112, 3D sensors 113, and/or other components. The identifying device 112 can comprise a projector, a head mounted display, and/or any other type of device configured to identify a space. For example, the identifying device 112 can comprise a projecting device configured to direct a light into a particular space. The 3D sensor 113 can comprise an imaging device with depth perception to replicate three-dimensional elements in the form of point cloud data. For example, the 3D sensor 113 can comprise a 3D RealSense™ camera.

The package loading system 100 can comprise one or more computing devices 114. The computing devices 114 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The computing device 114 may include a display 209. The display 209 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc. Also, various data is stored in one or more data stores 251 that are accessible to the one or more computing devices 114.

The computing device 114 may be configured to execute various applications such as an optimization engine 245, an agent application 248, and/or other applications. The optimization engine 245 can be executed in the computing device 114 to determine an optimal placement within a current loading configuration of incoming packages 106 to be loaded into a vehicle 109. The optimization engine 245 can also assist an agent 103 in identifying the determined optimal placement for a particular incoming package 106.

The agent application 248 can be executed in the computing device 114 to generate content that can notify the agent 103 of the identification of the optimal placement of incoming packages 106. As such, the agent application 248 can render a user interface 221 on the display 209. The agent application 248 can further provide additional information related to the package loading system 100 such as, for example, whether the package loading system 100 needs to be repositioned due to a completion of a package wall, a detected error in placement, and/or any other information as can be appreciated.

It should be noted that in some embodiments, the optimization engine 245 and the agent application 248 are executed by different computing devices 114. For example, the optimization engine 245 can be executed by a first computing device 114 and the agent application 248 can be executed by a second computing device 114.

The data stored in the data store 251 includes, for example, package data 212, sensor data 254, vehicle data 260, and potentially other data. The package data 212 comprises information about packages 106 associated with the facility. For example, the package data 212 can correspond to packages being packaged and/or sorted within the facility. According to various embodiments, the package data 212 can comprise a package mass, a package volume, package dimensions, a package type, hazardous classification, fragility classification, and/or any other type of package attribute as can be appreciated. The package data 212 can be obtained, via the optimization engine 245, from the conveyor system 121, the facility application 233, and/or other application with access to the data store 251. The optimization engine 245 can store the obtained package data 212 in the data store 251.

The sensor data 254 can comprise the data obtained via the sensing subsystem 239. For example, the sensor data 254 can comprise point cloud data associated with the layout configurations of the vehicle 109. In some embodiments, the sensor data 254 can further comprise data associated with the calibration of the 3D sensors 113 as can be appreciated. The vehicle data 260 can comprise data associated with the vehicle 109 into which the packages 106 are being loaded. For example, the vehicle data 260 can comprise vehicle dimensions (e.g., height, length, width), weight restrictions, capacity restrictions, and/or other information as can be appreciated.

The mobile unit 118 can comprise a cart, autonomous vehicle, robotic unit, and/or any other type of device that can move in any direction for repositioning. The components of the package loading system 100 (e.g., identifying device 112, 3D sensor(s) 113, computing device 114, display 209, etc.) can be disposed, mounted, affixed, etc. on the mobile unit 118. The audio device 242 can comprise a speaker and/or other type of output device. The audio device 242 can be configured to broadcast audio signals associated with communications and/or other inquiries generated by the agent application 248 and/or optimization engine 245. For example, in some embodiments, an agent 103 can be notified of an optimal placement for incoming boxes via an audio notification.

Figure 3:
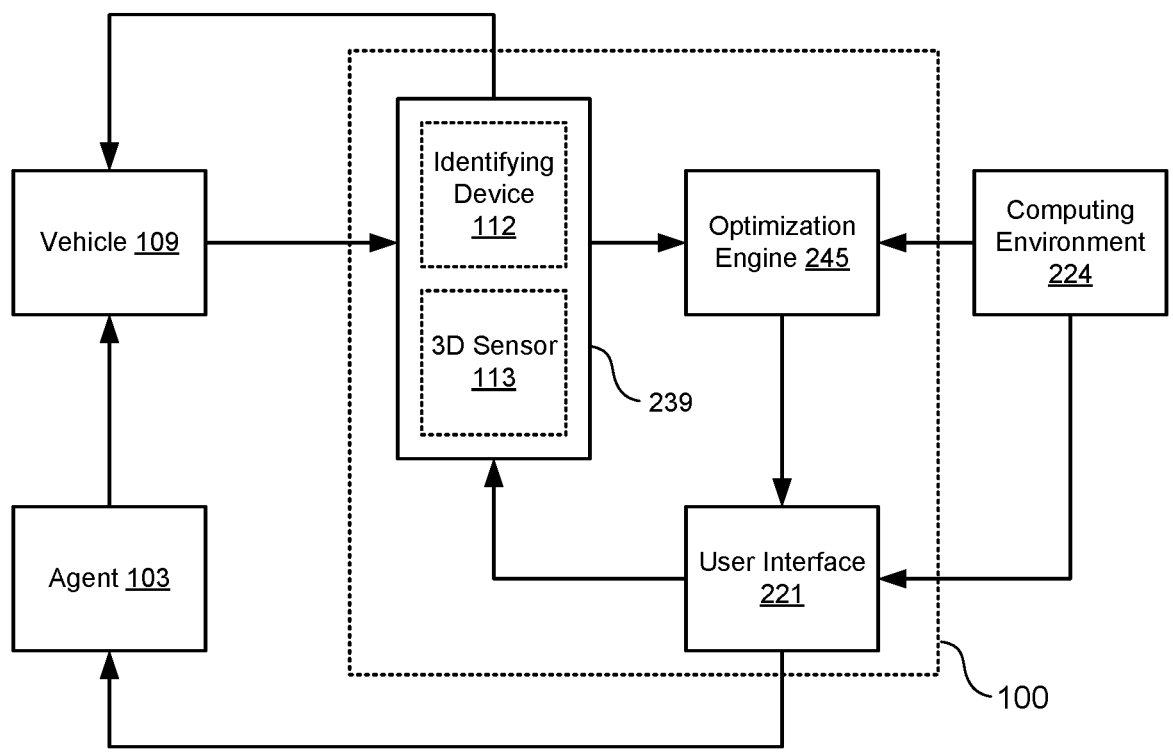
FIG. 3 is a schematic block diagram illustrating the operation of the various components of the networked environment of FIG. 2 according to various embodiments of the present disclosure.

Next, a general description of the operation of the various components of the networked environment 200 is provided, as illustrated in FIG. 3. According to various embodiments, the process of loading the vehicle 109 with packages 106 (FIG. 1) can begin by positioning the package loading system 100 at a predefined distance from an existing wall of packages 106. If a wall has not yet been constructed and/or started, the package loading system 100 can be positioned at a predefined distance from a back wall of the vehicle interior and/or any other location where the packages 106 will begin being loaded.

Once positioned, the 3D sensors 113 are calibrated based on the current position of the package loading system 100. In one non-limiting example, the 3D sensors 113 can be calibrated by projecting a light, via the identifying device 112, and using sensor data 254 (FIG. 2) (e.g., a point matrix of known spacing) to allow the 3D sensors 113 to calibrate known distances, as can be appreciated. The 3D sensors 113 are re-calibrated when package loading system 100 is repositioned.

Once the 3D sensors 113 are calibrated, the 3D sensors 113 can generate data corresponding to the current loading configuration 403 (FIG. 4) within the vehicle 109. For example, the generated sensor data 254 can correspond to point cloud data that can be used to identify the packages 106 already placed within the vehicle 109 as well as the current empty spaces 115 (FIG. 1).

According to various embodiments, the optimization engine 245 obtains sensor data 254 representing the current loading configuration 403 from the 3D sensors 113 of the sensing subsystem 239. The optimization engine 245 can also obtain package data 212 (FIG. 2) from the computing environment 224 via the facility application 233. For example, incoming packages 106 to be loaded into the vehicle 109 can be transported to the vehicle 109 via a conveyor system 121 (FIG. 1). According to various embodiments, package data 212 associated with the incoming packages 106 can be obtained and used to identify the incoming packages 106. For example, in some embodiments, the conveyor sensors 215 (FIG. 2) can be configured to scan package identifiers 218 affixed on packages 106 being transported on the conveyor system 121. According to some embodiments, the facility application 233 can receive the package identifier 218 and use the package identifier 218 to identify the corresponding package data 212 that is stored in the data store 230 (FIG. 2).

Once the loading configuration 403 and package data 212 are determined, the optimization engine 245 can determine the optimal placement of the incoming packages 106 with an aim for complete utilization of the inner space of the vehicle 109 by constructing consecutive walls that minimize the distance and/or amount of white space between the walls and packages 106.

Each package wall can be denoted by i; =1, . . . I. Each package wall can be divided into layers. For example, there can be three layers in each wall. Each layer can be denoted as k; k=1, . . . . K. There are a total of K layers that can be formed in a wall. The bottom-most layer can be k=1 and the top-most layer can be k=K. Each package 106 (uniquely identified) can be denoted by j; j=1, . . . , J. The total number of packages that need to go into the vehicle interior (or can reasonably fit into the interior) is J.

The optimization function used by the optimization engine 245 in calculating maximum utilization of the vehicle interior is $$Z = \max \frac{\sum_{i=1}^{I} \sum_{j=1}^{J} \sum_{k=1}^{K} v_j x_{ij}^k}{V_{max}} \quad (1)$$

The parameters defined in Table 1 can be used by the optimization engine 245 in maximizing utilization of the vehicle 109. However, according to various embodiments, any type of parameter and maximum limit can be used. In addition, in some embodiments, the optimization function used by the optimization engine 245 can be extended to include multiple vehicles 109 being loaded simultaneously by adding another index.

TABLE 1

| Parameter | Definition |
|---|---|
| $l_j$ | Length of package j (FIG. 5) |
| $h_j$ | Height of package j (FIG. 5) |
| $wd_j$ | Width of package j (FIG. 5) |
| $w_j$ | Weight of package j |
| $v_j$ | Volume of package j |
| $L_{max}^i$ | Maximum length of wall i. The value will depend on the inner dimensions of the vehicle interior |
| $H_{max}^i$ | Maximum height of wall i. The value will depend on the inner dimensions of the vehicle interior |
| $WD_{max}^i$ | Maximum width of wall. The value will depend on the inner dimensions of the vehicle interior |
| $W_{max}^i$ | Maximum weight of wall. |
| $L_{max}$ | Maximum length of vehicle interior. |
| $V_{max}$ | Maximum volume of vehicle interior. |

Additionally, the variables for maximizing utilization of the vehicle 109 are defined in Table 2.

TABLE 2

| Variables | Definition |
|---|---|
| Standard | $x_{ij}^k = 1$, if package j goes in the wall, layer k. $x_{ij}^k = 0$, otherwise. |
| Binary Variables for Sequencing Constraints | $y_{ijj'}^{k+1} = 1$, if constraint 12 is true. $z_{ijj'}^{k+2} = 1$, if constraint 14 is true. |

Various constraints that can be used by the optimization engine 245 in maximizing the vehicle utilization are as follows:

$$\sum_{i=1}^{I} \sum_{j=1}^{J} \sum_{k=1}^{K} v_j x_{ij}^k \leq V_{max} \quad (2)$$

$$\sum_{i=1}^{I} \sum_{j=1}^{J} \sum_{k=1}^{K} wd_j x_{ij}^k \leq L_{max}, \forall i \quad (3)$$

$$\sum_{j=1}^{J} \sum_{k=1}^{K} l_j x_{ij}^k \leq L_{max}^i, \forall i \quad (4)$$

$$\sum_{j=1}^{J} \sum_{k=1}^{K} wd_j x_{ij}^k \leq WD_{max}^i, \forall i \quad (5)$$

$$\sum_{j=1}^{J} \sum_{k=1}^{K} h_j x_{ij}^k \leq H_{max}^i, \forall i \quad (6)$$

$$\sum_{j=1}^{J} \sum_{k=1}^{K} w_j x_{ij}^k \leq W_{max}^i, \forall i \quad (7)$$

$$\sum_{j=1}^{I} \sum_{k=1}^{K} x_{ij}^k = 1, \forall j \quad (8)$$

$$\sum_{j=1}^{J} w_j x_{ij}^k \geq \sum_{j=1}^{J} w_j x_{ij}^{k+1} \geq \sum_{j=1}^{J} w_j x_{ij}^{k+2}, \forall i, k \quad (9)$$

$$\sum_{j=1}^{J} v_j x_{ij}^k \geq \sum_{j=1}^{J} v_j x_{ij}^{k+1} \geq \sum_{j=1}^{J} v_j x_{ij}^{k+2}, \forall i, k \quad (10)$$

$$l_j x_{ij}^k \times h_j x_{ij}^k \times wd_j^k = v_j x_{ij}^k, \forall i, j, k \quad (11)$$

In some embodiments, the optimization engine 245 can apply all of the constraints. In other embodiments, the optimization engine 245 can apply a subset of the constraints, as can be appreciated.

As discussed, the optimization engine 245 can determine a package sequence for all incoming packages 106. The package sequence corresponds to a sequence in which the packages can be loaded to maximize cubic efficiency within the vehicle 109. The sequencing constraints of the optimization engine 245 with a preference for higher layers being given to packages closer to volume of lower layers are the following:

$$\sum_{j=1}^{J} v_j x_{ij}^{k+1} \geq v_{j'} x_{ij'}^{k+1} + M(1 - y_{ijj'}^{k+1}) \quad (12)$$

$$\sum_{j=1}^{J} v_j x_{ij}^{k+1} \geq v_{j'} x_{ij'}^{k+1} + M(y_{ijj'}^{k+1}) \quad (13)$$

$$\sum_{j=1}^{J} v_j x_{ij}^{k+2} \geq v_{j'} x_{ij'}^{k+2} + M(1 - z_{ijj'}^{k+2}) \quad (14)$$

$$\sum_{j=1}^{J} v_j x_{ij}^{k+2} \geq v_{j'} x_{ij'}^{k+2} + M(z_{ijj'}^{k+2}) \quad (15)$$

It should be noted that in Constraints 12-15, a maximization function ("M( )") returns the maximum optimized value of the boundary condition associated with each constraint.

A package wall can be built in layers of progressive mass and volume. For example, large and heavy packages 106 (e.g., exceeding a weight and/or dimension threshold) that are tagged by the optimization engine 245 will form the base of each wall. Similarly, a total of K layers can be built according to the empty spaces 115 and available packages.

The output of the optimization function corresponds to the optimal placement for the incoming packages 106. According to various embodiments, the agent application 248 (FIG. 2) and/or the optimization engine 245 can generate a user interface 221 including the identification of the next package 106 and/or an area associated with the location of the empty space 115 for placement of the package 106. For example, the identification of the next package 106 can comprise a package identifier 218, a type of package 106, a dimension of the package 106, and/or other identifying attribute associated with the package 106. The location of the empty space 115 can comprise a general region (e.g., lower quadrant, upper quadrant, right quadrant, left quadrant, etc.), or a specific location.

In some embodiments, the agent 103 can be notified of the optimal placement location for the package 106 via the identifying device 112. For example, the identifying device 112 can project a light highlighting the area where the package 106 is to be placed. In some embodiments, the agent 103 can be notified of the optimal placement location for the package 106 via an audio signal broadcasted via the audio device 242 (FIG. 2). In some embodiments, the agent 103 can be notified of the orientation of the package 106 for the particular empty space 115.

Once the agent 103 has been notified of the optimal placement, orientation, and/or package 106 to be loaded, the agent 103 can proceed with loading the package 106 in accordance with the received instruction. The sensing subsystem 239 can continually update the sensor data 254 based on the changes in the loading configuration, and the package loading system 100 can repeat the optimization determination and notification process until there are no more incoming boxes and/or the current wall being constructed is complete. If there are additional incoming packages to be loaded following the completion of a package wall, the package loading system 100 can be repositioned to begin the building process of an additional wall.

Figure 4:
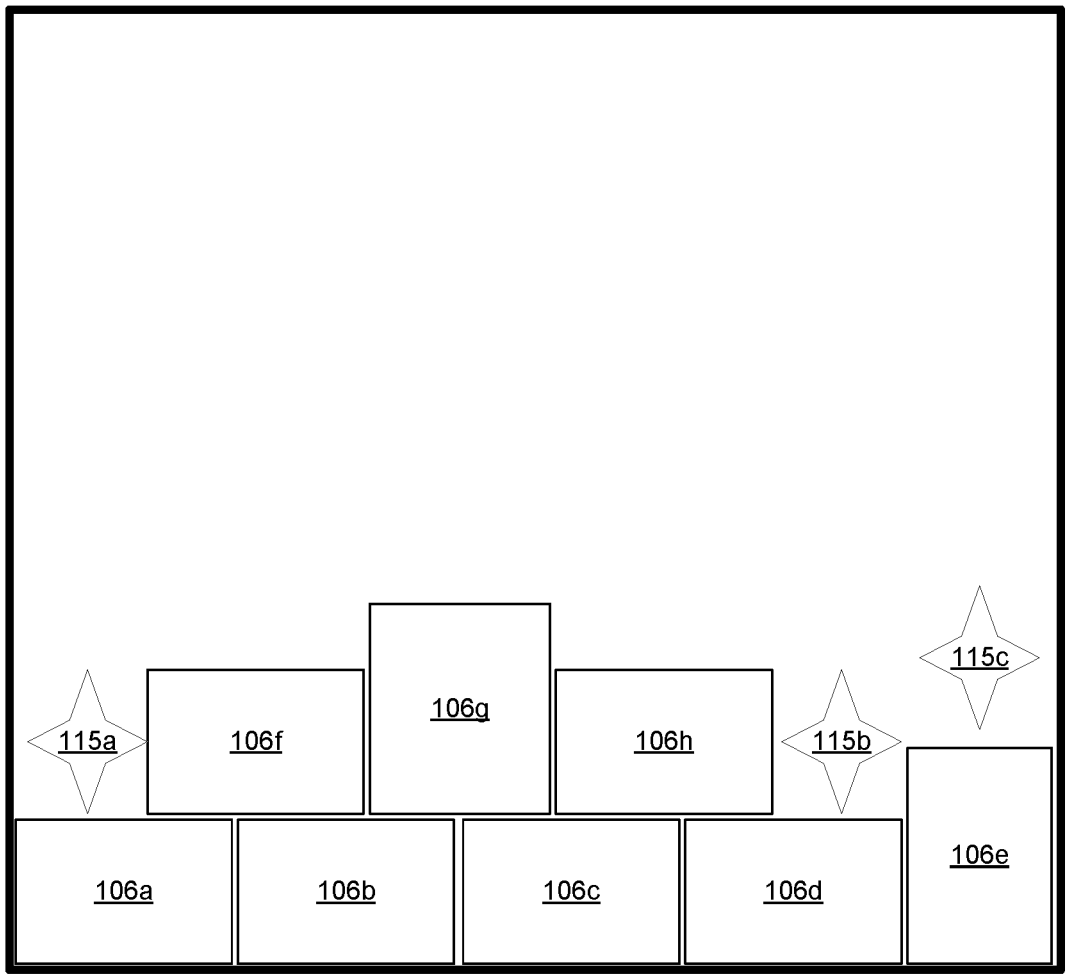
FIG. 4 is an example two-dimensional view of a layout configuration within a vehicle based on images captured by a three-dimensional (3D) sensor of a package loading system according to various embodiments of the present disclosure.

Turning now to FIG. 4, shown is an example view of a two-dimensional view of the layout configuration 403 within a vehicle interior as seen by the 3D sensor 113 (FIG. 1) according to various embodiments of the present disclosure. The layout configuration 403 of FIG. 4 illustrates packages 106 (e.g., 106a-106h) stacked in a particular configuration having empty spaces 115 (e.g., 115a, 115b, 115c). The optimization engine 245 (FIG. 2) can use the layout configuration 403 obtained from the 3D sensor 113 to determine the empty spaces 115 and determine the types of packages 106 and/or orientation of packages 106 for each empty space.

Assume that the incoming packages 106 correspond to Package A, Package B, Package C, Package D, and Package E. The incoming packages 106 can vary from one another with respect to volume, dimensions, mass, etc. The optimization engine 245 can determine the volume associated with each space by using classical geometry and X, Y, and Z coordinates. The optimization engine 245 may determine that only Package A and Package B can fit in empty space 115a, only package C can fit in empty space 115b, and Package D and Package E can fit into empty space 115c. Further, as discussed with respect to FIGS. 5A-5C, the optimization engine 245 can determine an optimal orientation of the packages for each empty space 115.

Figure 5A:
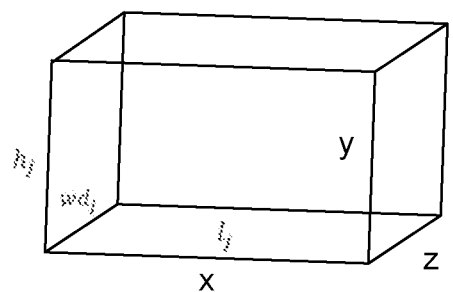
FIGS. 5A-5C are example orientations of a package that can be considered by a package loading system in determining an optimal placement for the package according to various embodiments of the present disclosure.
Figure 5B:
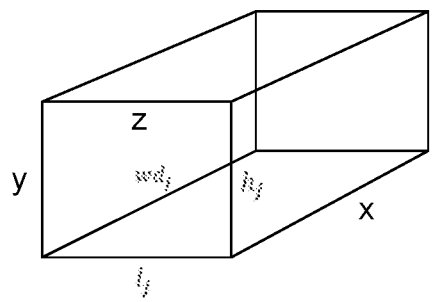
Figure 5C:
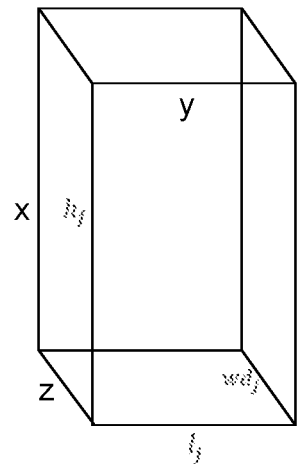

Referring next to FIGS. 5A-5C, shown are example orientations of a package 106 (FIG. 1) that can be considered by the package loading system 100 according to various embodiments of the present disclosure. For example, each space 115 on a wall can be viewed by the sensing subsystem 239 (FIG. 2) in the form of point cloud data. Based on this information, X, Y, and Z coordinates can be identified. Using classical coordinate geometry, the axial coordinates can provide an approximate volume for each empty space 115, and a type of package 106 and an orientation of the package 106 that would fit well in the empty space 115 can be determined.

For example, if a baseline is set that X is the length, Y is the height, and Z is the width, the volumes of the three could be (lbh)=XZY, ZXY, and YZX. The different volumes can represent the different box orientations. As such, the package loading system 100 can further determine and provide orientation options associated with the best fit for the package 106 in the identified empty spaces 115.

Figure 6A:
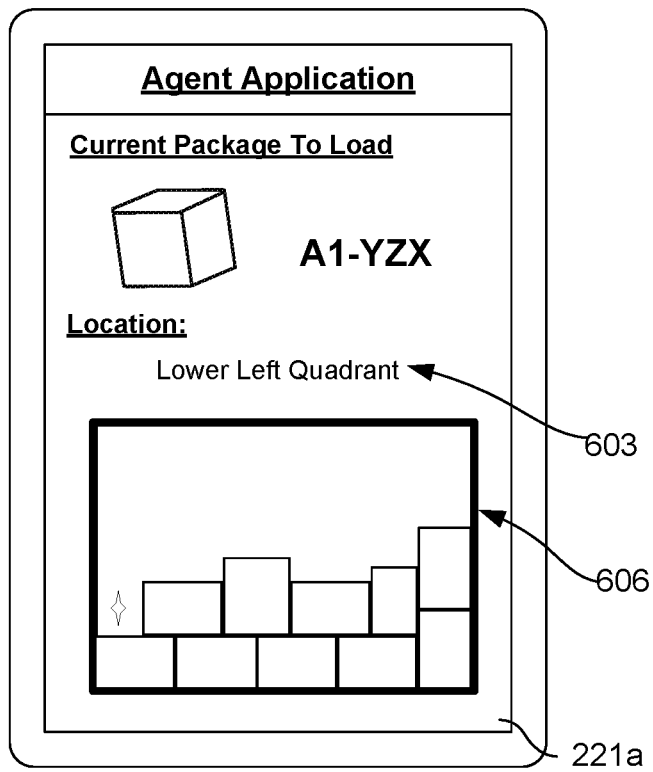
FIGS. 6A-6B are pictorial diagrams of example user interfaces rendered by a computing device of the package loading system of FIG. 2 according to various embodiments of the present disclosure.
Figure 6B:
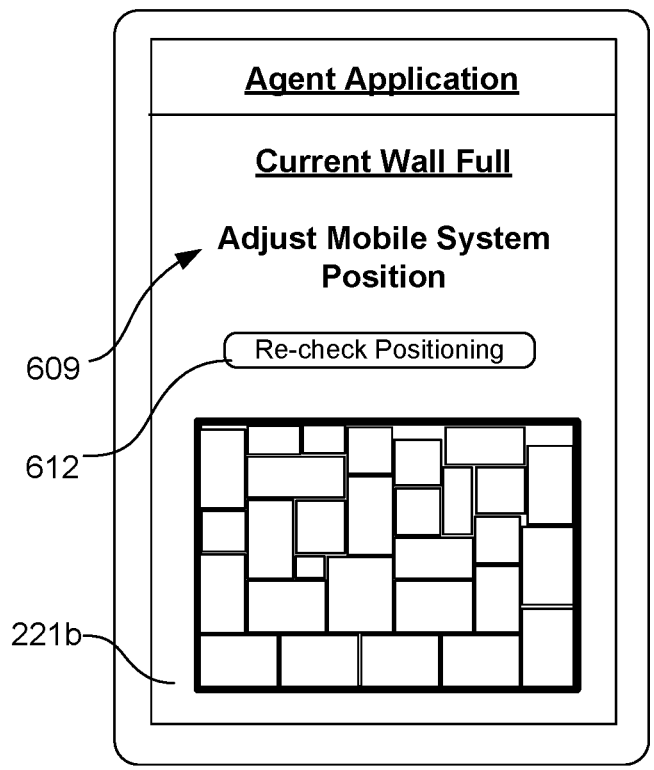

Referring next to FIGS. 6A and 6B, shown are example user interfaces 221 that can be rendered on the display 209 (FIG. 2) of the computing device 114 (FIG. 1) according to various embodiments of the present disclosure. For example, FIG. 6A is an example user interface 221a that can be rendered on the display 209 to assist an agent 103 (FIG. 1) identifying the next package 106 (FIG. 1) to load in the vehicle 109 (FIG. 1). In the example of FIG. 6A, the user interface 221a includes an identification of a type of package 106 and orientation for the package 106 that is to be loaded into the vehicle 109. The user interface 221a further provides a location of where the package 106 should be loaded onto the vehicle. For example, the user interface 221a includes a general region 603 (e.g., "lower left quadrant") of where the package should be loaded as well as pictorial view 606 of where the package 106 should be loaded.

Turning now to FIG. 6B, shown is an example user interface 221b that can be rendered on the display 209 of the computing device 114. The user interface 221b includes a notification 609 that notifies the agent 103 (FIG. 1) that the package loading system 100 (FIG. 1) needs to be repositioned. For example, the cross-section of the package wall being constructed is complete and there are no more available spaces for the upcoming packages 106, the optimization engine 245 (FIG. 2) can notify the agent 103 that a repositioning of the package loading system 100 is required to build a new wall for the incoming packages 106. The user interface 221b further includes a selectable component 612 that when selected can notify the optimization engine 245 that the package loading system 100 has been repositioned. A selection of the selectable component 612 can instruct the optimization engine 245 to recalibrate the 3D sensors 113 and begin building the next wall of packages 106.

Figure 7:
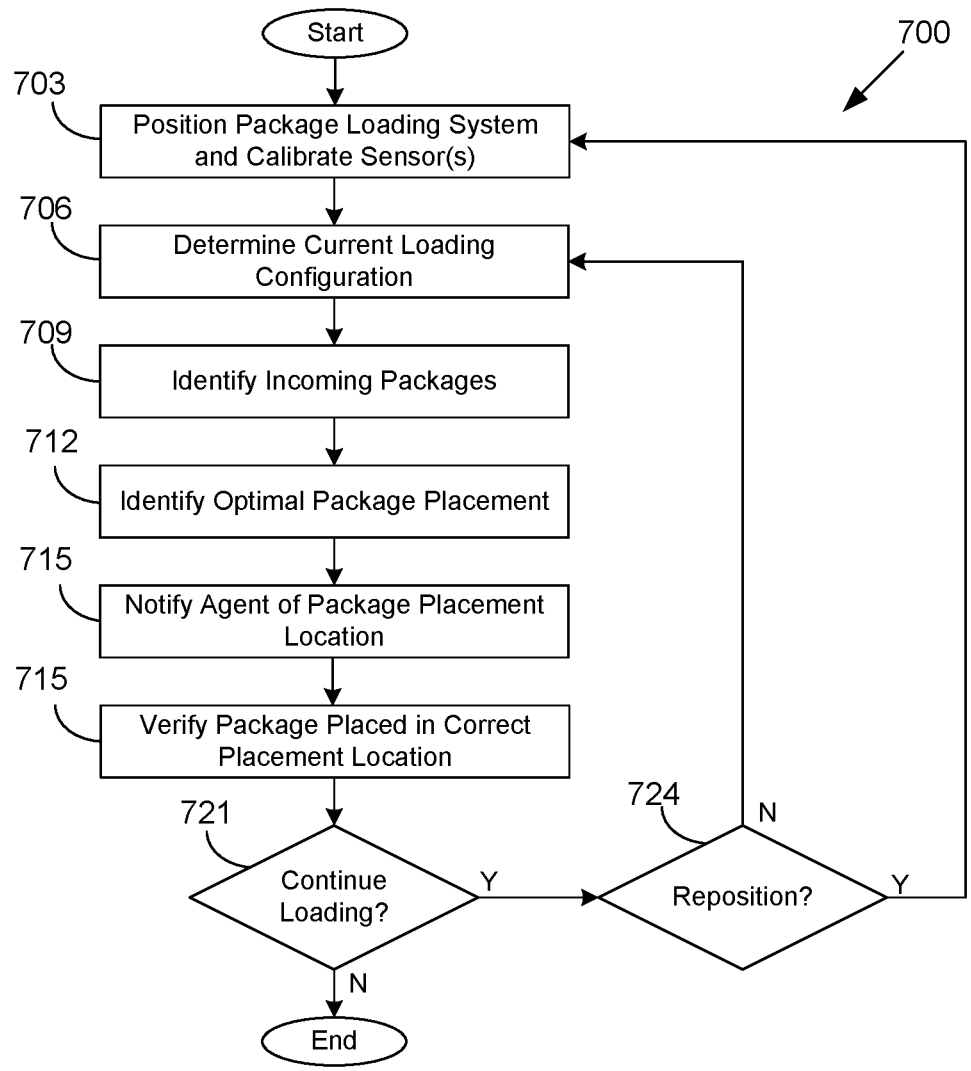
FIGS. 7-9 are flowcharts illustrating examples of functionality implemented as portions of the package loading system of FIG. 2 according to various embodiments of the present disclosure.
Figure 8:
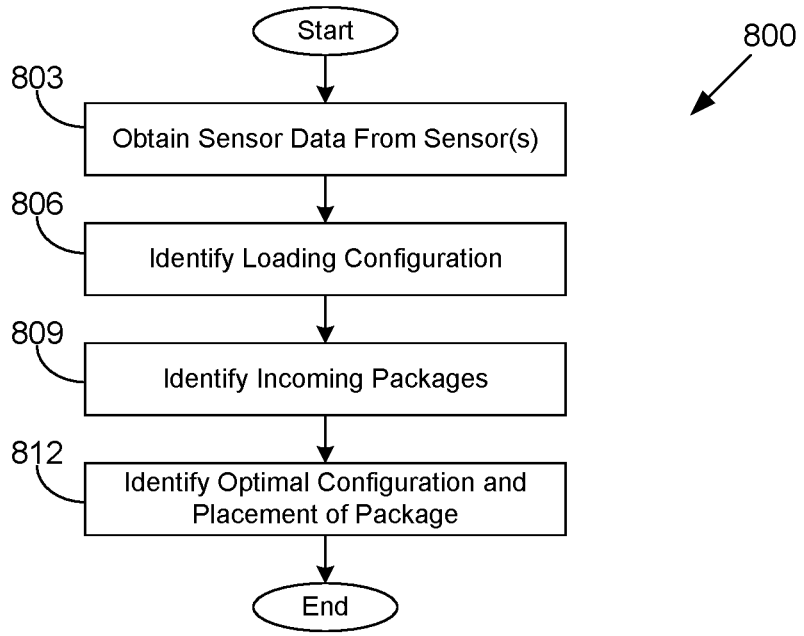
Figure 9:
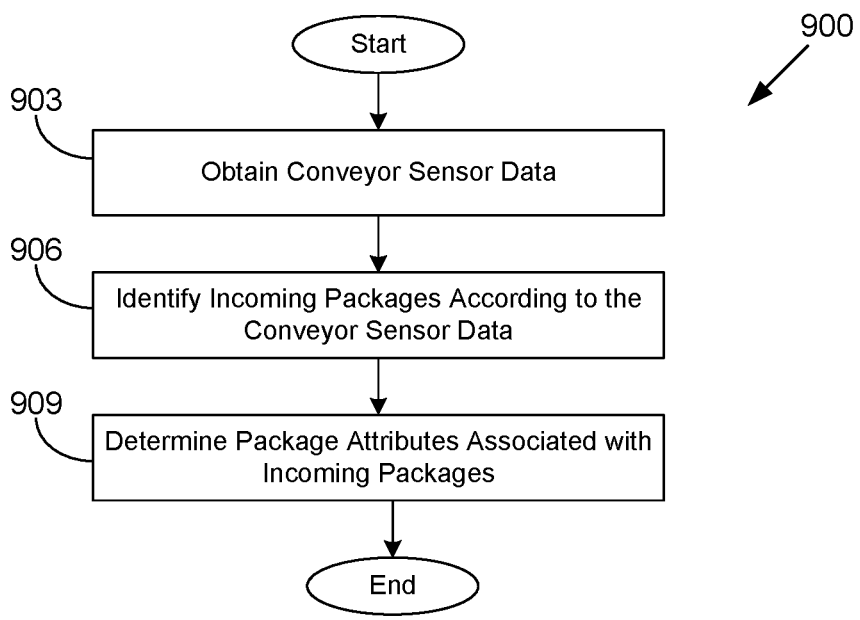

Referring next to FIGS. 7-9, shown are flowcharts that provide examples of the operation of portions of the optimization engine 245 (FIG. 2) according to various embodiments. It is understood that the flowcharts of FIGS. 7-9 provide merely examples of the many different types of functional arrangements that may be employed to implement the operation of different applications as described herein. As an alternative, the flowcharts of FIGS. 7-9 may be viewed as depicting examples of elements of methods implemented in the package loading system 100 (FIG. 1) according to one or more embodiments.

FIG. 7 is a flowchart 700 that provides one example of the operation of a package loading system 100 according to various embodiments of the present disclosure. Beginning with box 703, the package loading system 100 is positioned at a predefined distance from an existing wall of packages 106 (FIG. 1) and the 3D sensors 113 of the package loading system 100 are calibrated. If a wall has not yet been constructed and/or started, the package loading system 100 can be positioned at a predefined distance from a back wall of the vehicle interior and/or any other location where the packages 106 will begin being loaded. The predefined distance corresponds to a distance that is sufficient for the 3D sensors 113 (FIG. 1) to capture the loading configuration 403 (FIG. 4) within the vehicle 109 (FIG. 1). The predefined distance can be set according to a type of vehicle, a depth of the vehicle, a width of the vehicle, capabilities of the 3D sensor (e.g., focal length, sensor resolution, etc.), and/or any other features.

The 3D sensors 113 of package loading system 100 are calibrated according to the position of the package loading system 100. According to various embodiments, the 3D sensors 113 can be calibrated by projecting a light, via the identifying device 112 (FIG. 1), and using a point matrix of known spacing to allow the 3D sensors 113 to calibrate known distances, as can be appreciated. According to various embodiments, as the 3D sensors 113 are calibrated, the positioning of the package loading system 100 can be readjusted as needed until calibration of the 3D sensors is complete.

At box 706, the optimization engine 245 determines the current loading configuration 403. The current loading configuration 403 is determined by obtaining sensor data 254 (FIG. 1) from the 3D sensors 113. The 3D sensors 113 are configured to generate point cloud data representing the current view within the vehicle 109. The point cloud data can be used to determine a current loading configuration 403 of the packages 106 currently stacked with the vehicle 109. The loading configuration 403 corresponds to a representation of a layout of packages 106 stacked within the cross-section of the vehicle 109 where the current package wall is being built.

At box 709, the optimization engine 245 identifies incoming packages 106 that are to be loaded into the vehicle 109. According to various embodiments, the optimization engine 245 can identify the incoming packages 106 via data communication with the conveyor system 121 (FIG. 1) and/or the computing environment 224. For example, incoming packages 106 to be loaded into the vehicle 109 can be transported to the vehicle 109 via a conveyor system 121. In some embodiments, the conveyor sensors 215 (FIG. 2) of the conveyor system 121 can scan package identifiers 218 (FIG. 2) affixed on packages 106 being transported on the conveyor system 121. In some embodiments, the conveyor system 121 can send the package identifier 218 to the optimization engine 245 that can then request package data 212 from the computing environment 224. In other embodiments, the conveyor system 121 can send the package identifier 218 to the computing environment 224 and request the corresponding package data 212 (FIG. 2).

At box 712, the optimization engine 245 identifies the optimal package placement according to the incoming packages 106 and current loading configuration 403. According to various embodiments, the optimization engine 245 employs the optimization function of Equation (1) to determine a package sequence of the incoming packages 106 and optimal placement for the incoming packages 106. The package sequence corresponds to a priority in which the incoming packages 106 are to be loaded into the vehicle 109.

For example, although Package A may be the next package on the conveyor system 121 to arrive at the vehicle, Package B may be the most optimal package to be loaded into a particular empty space 115 (FIG. 1). As such, Package B may be listed before Package A in a package sequence. In other examples, if the first layer of a package wall is being built, the incoming packages 106 that meet certain size and dimensions requirements (e.g., heavy, large, etc.) may be listed in the sequence before smaller and/or lighter packages 106. The output of the optimization function corresponds to the optimal location for the incoming packages to be placed in order to maximize cubic efficiency within the vehicle 109 and minimize an amount of empty space within the vehicle 109.

At box 715, the package loading system 100 notifies an agent 103 (FIG. 1) of the optimal placement for the incoming packages 106. According to various embodiments, the agent application 248 (FIG. 2) and/or the optimization engine 245 can generate a user interface 221 (FIG. 2) including the identification of the next package 106 and/or an area associated with the location of the empty space 115 for placement of the package 106. For example, the identification of the next package 106 can comprise a package identifier 218, a type of package 106, a dimension of the package 106, and/or other identifying attribute associated with the package 106. The location of the empty space 115 can comprise a general region (e.g., lower quadrant, upper quadrant, right quadrant, left quadrant, etc.), or a specific location. The agent application 248 can cause the user interface 221 to be rendered on a display 209 (FIG. 2) of the computing device 114 (FIG. 1).

In some embodiments, the optimization engine 245 can determine that some of the incoming packages 106 (e.g., envelopes) are too small and/or do not meet predefined thresholds for stacking individually. In such situations, the optimization engine 245 can notify the agent that the incoming packages 106 should be placed into a container and/or other type of packaging that when filled to a particular capacity is stacked in the vehicle 109.

In some embodiments, the optimization engine 245 can instruct the identifying device 112 to project a light highlighting the area where the package 106 is to be placed. In some embodiments, the agent 103 can be notified of the optimal placement location for the package 106 via an audio signal broadcasted via the audio device 242 (FIG. 2). In some embodiments, the agent 103 can be notified of the orientation of the package 106 for the particular empty space 115. Once the agent 103 has been notified of the optimal placement, orientation, and/or package 106 to be loaded, the agent 103 can proceed with loading the package 106 in accordance with the received instruction.

At box 718, the package loading system 100 verifies that the package 106 has been placed in the optimal package placement location. In some embodiments, the optimization engine 245 can obtain point cloud data from the 3D sensors 113 following placement of the package 106 and determine whether the agent 103 loaded the correct package 106 and/or loaded the correct package 106 in the notified location using the obtained point cloud data. For example, the optimization engine 245 can compare a loading configuration 403 obtained prior to the placement of the package 106 with a loading configuration 403 corresponding to the obtained point cloud data following the placement to determine whether the package was placed in the correct location.

In some embodiments, the package loading system 100 can notify the agent 103 of an improper placement and/or package 106 if detected. For example, the package loading system 100 can notify the agent 103 of an improper placement and/or package 106 via a user interface 221 rendered on the display 209 of the computing device 114. In another example, the package loading system 100 can notify the agent 103 of an improper placement via an auditory signal via the audio device 242.

In other embodiments, the package loading system 100 does not notify the agent 103 of a detected improper placement and/or package 106. As such, the package loading system 100 can proceed with determining the next optimal placement using the loading configuration 403 associated with the improper placement.

At box 721, the package loading system 100 determines whether to continue loading the vehicle 109. For example, if there are additional packages 106 to load and vehicle 109 has not yet reached capacity, the package loading system 100 will determine that loading should continue and will proceed to box 724. Otherwise, at least this portion of the process for loading packages 106 in a vehicle 109 ends.

At box 724, the package loading system 100 determines whether the package loading system 100 needs to be repositioned. For example, if the cross-section of the current package wall within the vehicle 109 is full (e.g., no more room for additional packages), the package loading system 100 will need to be repositioned to begin building a new package wall. If there are still empty spaces in the current package wall where incoming packages 106 can be placed, the package loading system 100 may continue loading packages 106 without repositioning. If the package needs to be repositioned, the package loading system 100 proceeds to box 703. Otherwise, the package loading system 100 proceeds to box 706.

According to various embodiments, package data 212 associated with the incoming packages 106 can be obtained and used to identify the incoming packages 106. For example, in some embodiments, the conveyor sensors 215 (FIG. 2) can be configured to scan packages identifiers 218 affixed on packages 106 being transported on the conveyor system 121. According to some embodiments, the facility application 233 (FIG. 2) can receive the package identifier 218 and use the package identifier 218 to identify the corresponding package data 212 that is stored in the data store 230 (FIG. 2).

Referring next to FIG. 8, shown is a flowchart 800 that provides one example of the operation of the optimization engine 245 according to various embodiments of the present disclosure. In box 803, the optimization engine 245 obtains the sensor data 254 (FIG. 2) from the 3D sensor 113 (FIG. 1). According to various embodiments, the sensor data 254 obtained from the 3D sensor 113 replicates three-dimensional elements in the form of point cloud data. In the present case, the sensor data 254 corresponds to a representation of the packages 106 (FIG. 1) stacked in the vehicle 109 (FIG. 1).

TABLE 1

| Parameter | Definition |
| --- | --- |
| $l_j$ | Length of package j (FIG. 5) |
| $h_j$ | Height of package j (FIG. 5) |
| $wd_j$ | Width of package j (FIG. 5) |
| $w_j$ | Weight of package j |
| $v_j$ | Volume of package j |
| $L_{max}^i$ | Maximum length of wall i. The value will depend on the inner dimensions of the vehicle interior |
| $H_{max}^i$ | Maximum height of wall i. The value will depend on the inner dimensions of the vehicle interior |
| $WD_{max}^i$ | Maximum width of wall i. The value will depend on the inner dimensions of the vehicle interior |
| $W_{max}^i$ | Maximum weight of wall i. |
| $L_{max}$ | Maximum length of vehicle interior. |
| $V_{max}$ | Maximum volume of vehicle interior. |

At box 806, the optimization engine 245 identifies the loading configuration 403 (FIG. 4) generated via the sensor data 254. According to various embodiments, and the empty spaces 115 (FIG. 1) in loading configuration 403 can be identified. For example, using the sensor data 254, X, Y, and Z coordinates can be identified and the axial coordinates can provide an approximate volume for each empty space 115 within the loading configuration 403.

At box 809, the optimization engine 245 identifies the incoming packages 106. In some embodiments, the incoming packages 106 are identified according to data obtained via a conveyor sensor 215 (FIG. 2) of the conveyor system 121 (FIG. 1). For example, the conveyor sensor 215 can obtain a package identifier 218 (FIG. 2) on a package 106 being transported on the conveyor system 121. The obtained package identifier 218 can be used to obtain package data 212 (FIG. 2) that can be then transmitted to the optimization engine 245. The package data 212 can be used to identify the incoming packages 106.

At box 812, the optimization engine 245 identifies the optimal configuration and placement of incoming packages 106. For example, the optimization engine 245 determines the optimal configuration and placement of incoming packages to maximize cubic efficiency and minimize the amount of air gaps between packages 106 and/or walls within the vehicle interior. According to various embodiments, the optimization engine 245 uses the optimization function of Equation (1) to generate a package sequence and determine an optimal position and/or orientation of the incoming packages according to the current layout configuration 403 and identified incoming packages 106. Once the optimal configuration and placement of incoming packages 106 is identified, this portion of the optimization engine 245 ends.

Turning now to FIG. 9, shown is a flowchart 900 that provides one example of the operation of the optimization engine 245 according to various embodiments of the present disclosure. In box 903, the optimization engine 245 can obtain conveyor sensor data from the conveyor sensor 215 (FIG. 2). The conveyor sensor data corresponds to data associated with the packages 106 (FIG. 1) being transported to the vehicle 109 via the conveyor system 121 (FIG. 1). For example, the conveyor sensor data can comprise a package identifier 218 (FIG. 2) and/or any other identifying feature of a package 106.

At box 906, the optimization engine 245 identifies incoming packages 106 according to the obtained conveyor sensor data. For example, the optimization engine 245 can send a request to the facility application 233 (FIG. 2) requesting package data 212 (FIG. 2) associated with the packages 106 associated with conveyor sensor data obtained from the conveyor sensor 215.

At box 909, the optimization engine 245 determines package attributes associated with the incoming packages 106. For example, the optimization engine 245 can obtain package data 212 from the facility application 233 in response to a request for package data 212. The optimization engine 245 can analyze the package data 212 to determine package attributes, such as, for example, package mass, package volume, package type, package dimensions, etc. The package attributes can be used by the optimization engine 245 in determining the optimal placement and package sequence in order to maximize cubic efficiency within the vehicle and minimize air gaps between packages and/or package walls. Upon determining the package attributes, this portion of the optimization engine 245 ends.

Next, a discussion of the technical devices of the network environment 200 is provided. Stored in memory are both data and several components that are executable by one or more processors. Also stored in the memory can be a data store 230, 251 and other data. The term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. In addition, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Although the facility application 233, optimization engine 245, agent application 248 and other various systems described herein can be embodied in software or code executed by general-purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   a sensing system;
   at least one computing device in data communication with the sensing system; and
   at least one application executable in the at least one computing device, wherein, when executed, the at least one application causes the at least one computing device to at least:
   determine a layout configuration based at least in part on point cloud data obtained from the sensing system, the point cloud data representing a cross-section of a loading space;
   determine item data associated with a plurality of incoming items to be loaded within the loading space, item data comprising at least a plurality of item dimensions and an item type;
   determine that the sensing system needs to be repositioned based at least in part on at least one of a completion of an item wall or a detected error in placement of an item in the cross-section of the loading space; and
   generate a notification on a user interface rendered on a display device associated with a loading agent, the notification alerting the loading agent that the sensing system needs to be repositioned.

2. The system of claim 1, wherein the sensing system comprises a plurality of three-dimensional (3D) cameras and a projector.

3. The system of claim 2, wherein the plurality of 3D cameras are configured to be calibrated in response to repositioning the sensing system.

4. The system of claim 1, wherein, when executed, the at least one application further causes the at least one computing device to at least determine a specific item of the plurality of incoming items to be placed in an unoccupied space of the layout configuration.

5. The system of claim 4, wherein the at least one computing device is configured to verify that the specific item of the plurality of incoming items has been placed in the unoccupied space of the layout configuration based at least in part on subsequent point cloud data obtained from the sensing system after the specific item has been placed in the loading space, the subsequent point cloud data representing an updated cross-section of the loading space.

6. The system of claim 1, wherein the layout configuration corresponds to a representation of a layout of items stacked within the cross-section of the loading space.

7. The system of claim 1, wherein the item data associated with the plurality of incoming items is received via a conveyor sensor located on a conveyor system used to transport the plurality of incoming items to the loading space.

8. The system of claim 1, wherein, when executed, the at least one application further causes the at least one computing device to at least identify a sequence of a plurality of incoming items to be loaded into the loading space, the sequence being based on item data of the plurality of incoming items and the layout configuration.

9. A method for loading an item into a loading space, comprising:
   identifying, via at least one computing device of an item loading system, a loading configuration within the loading space based at least in part on a cross-section of the loading space;
   determining, via the at least one computing device, item data associated with the item, the item data comprising a respective mass, a respective volume, and a respective type for the item;
   determining, via the at least one computing device, that the item loading system needs to be repositioned based at least in part on at least one of a completion of an item wall or a detected error in placement of an item in the cross-section of the loading space; and
   sending, via the at least one computing device, a notification to a loading agent, the notification alerting the loading agent that the item loading system needs to be repositioned.

10. The method of claim 9, wherein the item loading system comprises a plurality of three-dimensional (3D) cameras and a projector.

11. The method of claim 10, further comprising calibrating the plurality of 3D cameras in response to repositioning the item loading system.

12. The method of claim 9, further comprising determining, via the at least one computing device, an unoccupied space of the loading configuration to place the item according to an optimization function.

13. The method of claim 12, further comprising verifying that the item has been placed in the unoccupied space based at least in part on subsequent data obtained from the item loading system after the item has been placed in the loading space, the subsequent data representing an updated cross-section of the loading space.

14. The method of claim 9, further comprising receiving, via the at least one computing device, the item data via a conveyor sensor located on a conveyor system used to transport the item to the loading space.

15. The method of claim 9 further comprising identifying a sequence of a plurality of incoming items to be loaded into the loading space, the sequence being based on item data of the plurality of incoming items and the loading configuration.

16. A system, comprising:
   a sensing system;
   at least one computing device; and
   at least one application executable in the at least one computing device, wherein, when executed, the at least one application causes the at least one computing device to at least:
   identify a loading configuration associated with a loading space, the loading configuration corresponding to a representation of items stacked within a cross section of the loading space;
   identify a sequence of a plurality of incoming items to be loaded into the loading space, the sequence being based on item data of the plurality of incoming items and the loading configuration;
   determine that the sensing system needs to be repositioned based at least in part on the sequence of the plurality of incoming items; and
   generate a notification on a user interface rendered on a display device associated with a loading agent, the notification alerting the loading agent that the sensing system needs to be repositioned.

17. The system of claim 16, wherein determining that the sensing system needs to be repositioned is further based at least in part on at least one of a completion of an item wall or a detected error in placement of an item in the cross section of the loading space.

18. The system of claim 16, wherein, when executed, the at least one application further causes the at least one computing device to generate another notification that includes an identification of a next item in the sequence and a location of placement of the next item within the loading space.

19. The system of claim 18, wherein, when executed, the at least one application further causes the at least one computing device to verify that the next item in the sequence has been placed in the location of placement within the loading space based at least in part on point cloud data obtained from the sensing system, the point cloud data being obtained after the next item has been placed within the loading space, the point cloud data representing an updated cross section of the loading space.

20. The system of claim 16, wherein the item data associated with the plurality of incoming items is received via a conveyor sensor located on a conveyor system used to transport the plurality of incoming items to the loading space.

* * * * *